United States Patent
Chen et al.

(10) Patent No.: US 10,511,859 B2
(45) Date of Patent: Dec. 17, 2019

(54) METHOD AND APPARATUS FOR IMAGE COMPRESSION WITHOUT RESIDUE SIGNALING

(71) Applicant: MEDIATEK INC., Hsin-Chu (TW)

(72) Inventors: Li-Heng Chen, Tainan (TW); Tung-Hsing Wu, Chiayi (TW); Han-Liang Chou, Baoshan Township, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 196 days.

(21) Appl. No.: 15/404,313

(22) Filed: Jan. 12, 2017

(65) Prior Publication Data

US 2017/0230687 A1    Aug. 10, 2017

Related U.S. Application Data (60) Provisional application No. 62/291,050, filed on Feb. 4, 2016.

(51) Int. Cl.
| | |
|---|---|
| *H04N 19/593* | (2014.01) |
| *H04N 19/174* | (2014.01) |
| *H04N 19/182* | (2014.01) |
| *H04N 19/105* | (2014.01) |
| *H04N 19/147* | (2014.01) |
| *H04N 19/91* | (2014.01) |
| *H04N 19/124* | (2014.01) |
| *H04N 19/14* | (2014.01) |

(52) U.S. Cl.
CPC ......... *H04N 19/593* (2014.11); *H04N 19/105* (2014.11); *H04N 19/147* (2014.11); *H04N 19/174* (2014.11); *H04N 19/182* (2014.11); *H04N 19/124* (2014.11); *H04N 19/14* (2014.11); *H04N 19/91* (2014.11)

(58) Field of Classification Search
CPC .. H04N 19/593; H04N 19/147; H04N 19/105; H04N 19/174; H04N 19/182; H04N 19/14; H04N 19/124; H04N 19/91
See application file for complete search history.

(56) References Cited

U.S. PATENT DOCUMENTS

| | | | |
|---|---|---|---|
| 2014/0286413 A1* | 9/2014 | Joshi | H04N 19/70 375/240.12 |
| 2016/0065986 A1* | 3/2016 | Park | H04N 19/176 375/240.16 |

\* cited by examiner

*Primary Examiner* — Tat C Chio
(74) *Attorney, Agent, or Firm* — Wolf, Greenfield & Sacks, P.C.

(57) ABSTRACT

A method and apparatus of image coding including a no-residue prediction mode are disclosed. At the encoder side, current predictors for a current coding unit are determined according to a target prediction process associated with a target prediction mode. The current predictors are determined based on pixel data including reconstructed pixels in the current slice or the current image. The target prediction process is applied to the current coding unit using the current predictors to generate prediction residues. A distortion condition or a cost measure for the prediction residues is determined. If the distortion condition is satisfied or the cost measure favors coding without the prediction residues, the current coding unit is encoded into current compressed bits of the current coding unit without compressed data associated with the prediction residues. A corresponding decoding method and apparatus are also disclosed.

20 Claims, 9 Drawing Sheets

METHOD AND APPARATUS FOR IMAGE COMPRESSION WITHOUT RESIDUE SIGNALING

CROSS REFERENCE TO RELATED APPLICATIONS

The present invention claims priority to U.S. Provisional Patent Application Ser. No. 62/291,050, filed on Feb. 4, 2016. The U.S. Provisional Patent Application is hereby incorporated by reference in its entirety.

FIELD OF THE INVENTION

The present invention relates to entropy coding for image coding systems. In particular, the present invention relates to method and apparatus for encoding or decoding images without signaling the prediction residues.

BACKGROUND AND RELATED ART

Various video coding standards have been developed to reduce the required bitrate for video transmission or the required capacity for storage. For example, MPEG-2, MPEG-4 and AVC/H.264 have been widely used in various applications. In recent years, the coding efficiency has been substantially improved in newer video compression formats such as VP8, VP9 and the emerging HEVC (High Efficiency Video Coding) standards.

In various devices that involve image display, there is another type of application that requires data compression. In particular, display links connecting computers to monitors, set-top boxes to televisions, and application processors to display panels are digital interface formats widely used in the industry. Display links use digital interfaces. With the increasing demand for higher display resolutions and higher frame rates, the amount of data sent over display links becomes extremely high. For example, the display link between a set-box device and a 1080p HDTV at 120 Hz frame rate will require more than 7 Gbits/sec. For UHD (Ultra High Definition) TV, the required data will be four-fold higher. Therefore, display links are often in compressed formats. For example, DSC (Display Stream Compression) standard has been developed jointly by VESA (Video Electronics Standards Association) and MIPI Alliance to address the needs for data compression in display applications.

Figure 1A:
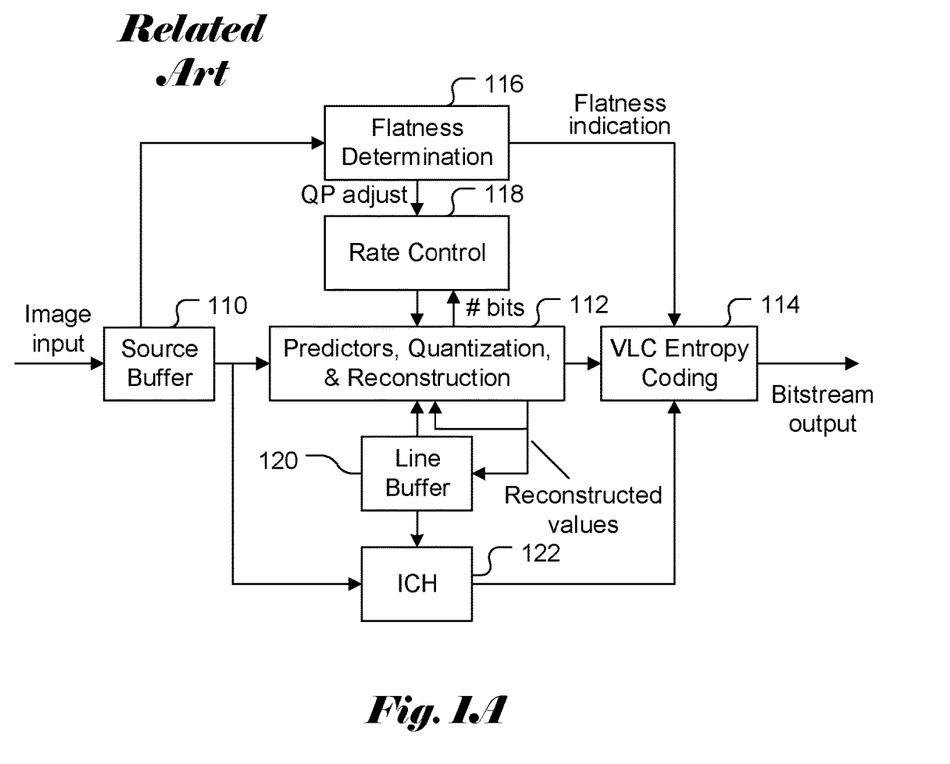
FIG. 1A illustrates major functional blocks of an exemplary system based on the Display Stream Compression (DSC) standard.
Figure 1B:
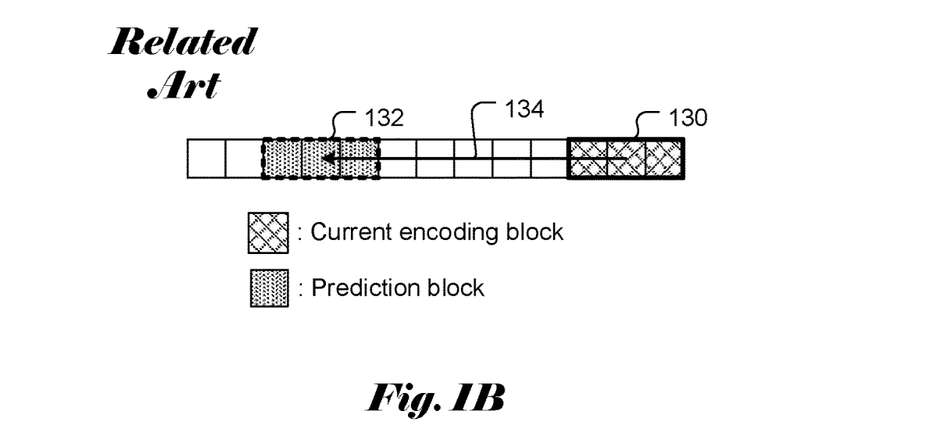
FIG. 1B illustrates an example of block prediction according to the Display Stream Compression (DSC) standard.

Due to different requirements, the DSC standard is different from popular video coding standards, such as MPEG-2/4, AVC/H.264 and HEVC. For example, the color space used for compression in display applications may be the YCoCg color space, instead of the YUV color space. Furthermore, DSC only includes Intra-frame compression without Inter-frame compression to minimize the processing delay and avoid the need for reference picture buffer. In typical applications, the compression ratios required for DSC is much smaller than those for video storage or network delivery. FIG. 1A illustrates major functional blocks of an exemplary DSC encoder. As shown in FIG. 1A, the DSC encoder includes a source buffer 110, a predictor/quantization/reconstruction unit 112, a VLC entropy coding unit 114, a flatness determination unit 116, a rate control unit 118, a line buffer 120, and an indexed color history (ICH) unit 122. If the input image data are in the RGB color format, a color-space converter (not shown in FIG. 1A) corresponding to a RGB-to-YCoCg color format converter is utilized in the DSC encoder. The information from the flatness determination unit 116 can be used to adjust the QP (quantization parameter) in the rate control unit 118. As shown in FIG. 1A, the flatness indication is entropy coded using the VLC entropy coding unit 114 and incorporated in the bitstream. According to DSC, the pixels are processed using a 1×3 block size as shown on FIG. 1B, where a current block 130 is predicted by a reference block 132 in the same pixel row. The location of the reference block 132 is indicated by a corresponding block vector 134.

Upon the growing needs for display links to support higher display resolutions and higher bit depth for color components, VESA initiated development efforts to establish a standard for Advanced Display Stream Compression (ADSC). Also, the ADSC supports native 4:2:0 and 4:2:2 coding to eliminate the need for converting pixels into RGB components. For example, ADSC allows more efficient compression in YCbCr 4:2:0 color sampling format. In addition, ADSC also supports High Dynamic Range (HDR) to accommodate the higher color depth in newer TV shows and movies.

The processing for display links often uses block-based compression, where a picture is divided into blocks and the compression is applied to each block. Furthermore, the compression settings may be applied to an image unit smaller than a picture. For example, Advanced DSC (ADSC) being developed is applied to slices of each picture and the target bitrate is imposed on each slice. Each slice is divided into coding units (i.e., blocks) and each coding unit consists of a block of N×M pixels, where N corresponds to block height and M corresponds to block width. According to ADSC, the characteristics of each block are evaluated in terms of "flatness", where the flatness of each block is categorized into five flatness types as follows:

Type: −1 denotes the "complex block"
Type: 0 denotes the "flat region"
Type: 1 denotes the "flat region (less flat than type 1)"
Type: 2 denotes the "complex to flat block"
Type: 3 denotes the "flat to complex block"

The flatness type is determined according to the complexity information of each block and its neighboring blocks. Flatness type influences the rate control behavior in each block. According to the existing ADSC draft standard, the syntax of flatness type is signaled in each coding unit.

It is desirable to further improve the compression efficiency of the ADSC. In particular, the present invention addresses performance improvement for the block prediction mode.

BRIEF SUMMARY OF THE INVENTION

A method and apparatus of image coding including a no-residue prediction mode are disclosed. At the encoder side, input pixels associated with a current coding unit in a current slice or a current image are received, where the current coding unit consists of N×M pixels and M and N are positive integers. Current predictors for the current coding unit are determined according to a target prediction process associated with a target prediction mode, where the current predictors are determined based on pixel data including reconstructed pixels in the current slice or the current image respectively and the reconstructed pixels are previously reconstructed before the current coding unit. The target prediction process is applied to the current coding unit using the current predictors to generate prediction residues. A distortion condition or a cost measure for the prediction residues is determined. If the distortion condition is satisfied or the cost measure favors coding without the prediction residues, the current coding unit is encoded into current compressed bits of the current coding unit without compressed data associated with the prediction residues. Otherwise, the current coding unit is coded using one of other modes. A bitstream comprising the current compressed bits of the current coding unit is provided.

At the encoder side, when the distortion condition is satisfied, said encoding the current coding unit into the current compressed bits of the current coding unit without compressed data associated with the prediction residues is referred as a target no-residue prediction mode and mode information for the target no-residue prediction mode is signaled in the current compressed bits of the current coding unit. The target prediction mode may correspond to Block Prediction mode. In this case, the distortion condition may correspond to all values of the prediction residues for the current coding unit being less than or equal to a threshold value or correspond to quantization parameter (QP) value of the current coding unit being greater than or equal to a threshold value. The reconstructed pixels for this case are within a reconstructed area bounded by a horizontal line located at N pixel lines above the current coding unit, and a vertical line located at k pixels to the left of left edge of the current coding unit and k is a positive integer. Furthermore, one or more block vectors pointing from the current coding unit to the current predictors in the reconstructed area are signaled in the current compressed bits of the current coding unit. The target prediction mode may also correspond to Transform mode or DPCM. In this case, the reconstructed pixels are within a reconstructed area bounded by a horizontal line located at one pixel line above the current coding unit, and a vertical line located at one pixel to the left of left edge of the current coding unit according to one embodiment. The cost measure corresponds to rate-distortion optimization associated with the prediction residues.

At the decoder side, a bitstream comprising current compressed bits associated with a current coding unit in a current slice or a current image is received, where the current coding unit consists of N×M pixels and M and N are positive integers. A current coding mode associated with the current coding unit is determined from the current compressed bits, where the current coding mode belongs to a coding mode group including one regular prediction mode and one corresponding no-residue prediction mode, and wherein said one regular prediction mode and said one corresponding no-residue prediction mode use a same prediction process. If the current coding mode is equal to said one corresponding no-residue prediction mode, parsing prediction residues from the current compressed bits is omitted and the current coding unit is reconstructed according to said same prediction process without the prediction residues. If the current coding mode is equal to said one regular prediction mode, the prediction residues are parsed from the current compressed bits and the current coding unit is reconstructed according to said same prediction process using the prediction residues. The reconstructed current coding unit is provided as output.

At the decoder side, current predictors for the current coding unit are determined according to said same prediction process, where the current predictors are determined based on pixel data including reconstructed pixels in the current slice or the current image respectively and the reconstructed pixels are previously reconstructed before the current coding unit. The reconstructed current coding unit is equal to the current predictors if the current coding mode is equal to said one corresponding no-residue prediction mode. Said one regular prediction mode may correspond to Block Prediction mode. In this case, the reconstructed pixels are within a reconstructed area bounded by a horizontal line located at N pixel lines above the current coding unit, and a vertical line located at k pixels to the left of left edge of the current coding unit and k is a positive integer according to one embodiment. Furthermore, one or more block vectors are derived from the current compressed bits and said one or more block vectors point from the current coding unit to the current predictors in the reconstructed area. Said one regular prediction mode may also correspond to Transform mode or DPCM mode. In this case, the reconstructed pixels are within a reconstructed area bounded by a horizontal line located at one pixel line above the current coding unit, and a vertical line located at one pixel to the left of left edge of the current coding unit according to one embodiment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In most image and video coding systems, the source pixels are processed to remove or reduce redundancy so that the processed source pixels are more suited for efficient transmission or storage. For example, the source pixels may be subject to prediction process, transform process or a combination to generate prediction residuals or transform coefficients. A quantization process may also be further applied to the prediction residuals or transform coefficients to reduce required data representation. The processing will generate a set of processed data, such as quantized residuals or quantized transform coefficients. The set of processed data along with related coding information and parameters, such as the coding mode for a block of pixels, are coded into final bitstream using entropy coding to exploit the statistical redundancy within the processed data, coding information and parameters. The processed data, coding information and parameters to be coded into the bitstream are often referred as symbols.

Figure 2A:
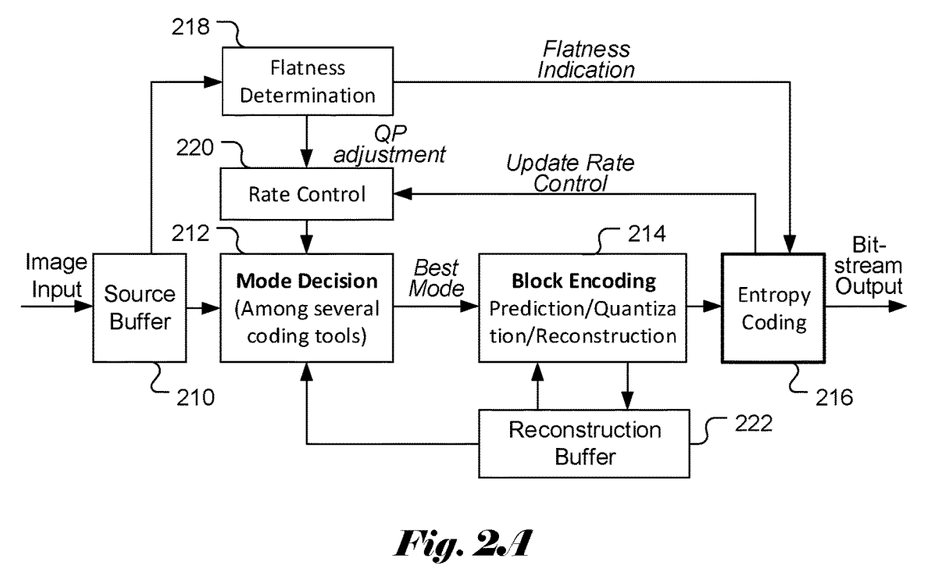
FIG. 2A illustrates major functional blocks of an exemplary system based on the Advanced Display Stream Compression (ADSC) draft.

FIG. 2A illustrates major functional blocks of an exemplary coding system according to the ADSC draft. The ADSC encoder includes a source buffer 210, a mode decision unit 212 to select a best mode for a current block being coded, a block encoding unit 214 to apply predictor, quantization and reconstruction to the current block using the best mode selected by the mode decision unit 212, a VLC entropy coding unit 216, a flatness determination unit 218, a rate control unit 220 and a reconstruction buffer 222. The reconstructed data buffered in the reconstruction buffer 222 will be used as reference data for encoding a current block and/or subsequent blocks. The reconstructed data buffered in the reconstruction buffer 222 will also be used in mode decision.

According to ADSC, various coding modes are used for coding the blocks. The coding modes include Transform mode, DPCM mode, BP (block prediction) mode, Pattern mode, MPP (midpoint prediction) mode, and MPPF (MPP fallback) mode. Midpoint Prediction (MPP) uses a midpoint value as the predictor in each block. For example, the midpoint value can be determined by half of dynamic range of the pixels or mean value of the neighboring reconstructed pixels of the current block.

Figure 2B:
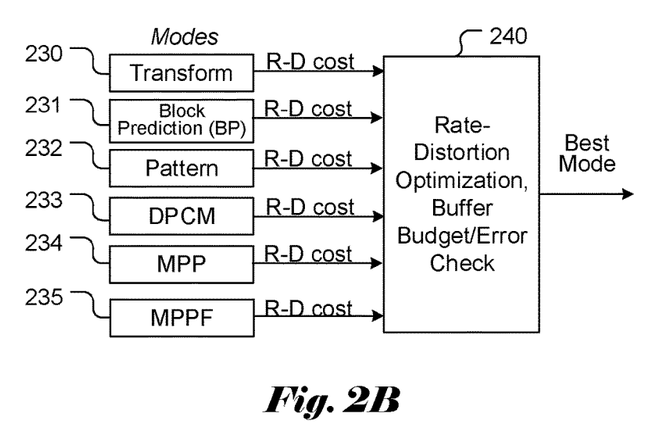
FIG. 2B illustrates mode decision process according to the Advanced Display Stream Compression (ADSC) draft.

FIG. 2B illustrates an exemplary mode decision process according to ADSC draft. The types of modes include 6 different modes (230 to 235). For each mode, the R-D cost (rate-distortion cost) is calculated and provided to a respective processing unit (240) to perform the rate-distortion optimization, buffer budget and error check function. The processing unit 240 inspects the buffer budget for each available mode. Part of modes can be turned off by encoder/decoder configuration, and the configuration can be signaled in high level syntax such as picture parameter set (PPS). The present invention may use similar processing flow as shown in FIG. 2A and FIG. 2B. However, the mode decision unit 212, the block encoding unit 214 and the entropy coding unit 216 may incorporate embodiments of the present invention.

Figure 3A:
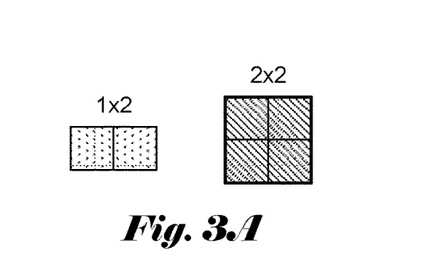
FIG. 3A illustrates an example of allowed variable block sizes (i.e., 2×2 and 1×2) for the block prediction mode according to Advanced Display Stream Compression (ADSC) v0.3.
Figure 3B:
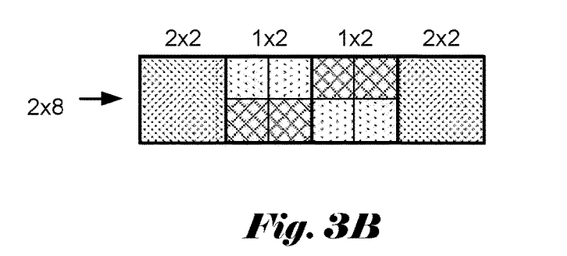
FIG. 3B illustrates an example of an image area consisting of 2×8 pixels, which is divided into four 2×2 blocks. For each 2×2 block, the block can be either coded as one 2×2 block or two 1×2 partitions.

For image compression, a prediction process is often used to improve the coding efficiency. For example, in the draft ADSC coding standard, various prediction modes, such as Block Prediction mode, Transform mode and DPCM mode, are used. The prediction processes take advantage of correlation or statistics of source data to generate prediction residues, which can be compressed more efficiently. In most image and video coding systems, a picture is divided into blocks and the coding process is applied to individual blocks. Usually, variable block size is allowed in most image and video compression systems. In Advanced Display Stream Compression (ADSC), the block size for the block prediction mode also can be variable block size. For example, the block size of block prediction mode in ADSC v0.3 can be either 1×2 or 2×2 as shown in FIG. 3A. The block size can be determined adaptively for each 2×2 block. For example, FIG. 3B illustrates an example of an image area consisting of 2×8 pixels, which is divided into four 2×2 blocks. For each 2×2 block, the block can be either coded as one 2×2 block or two 1×2 partitions as shown in FIG. 3B.

Figure 4A:
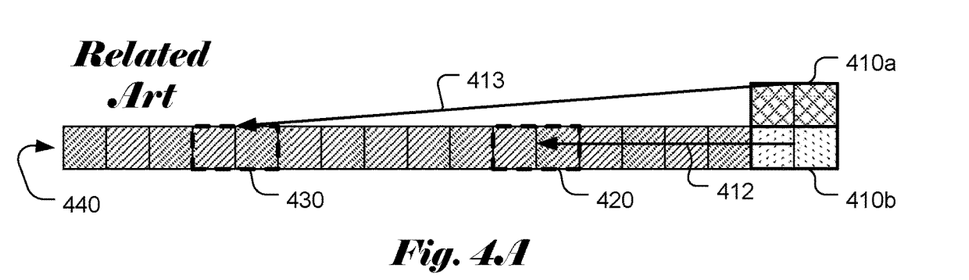
FIG. 4A illustrates an example of block prediction for the 1×2 block prediction mode for a 2×2 block located at the first line of a slice according to the conventional Advanced Display Stream Compression (ADSC).

For ADSC block prediction (BP) mode, each image is partitioned into one or more slices and each slice is partitioned into 2×8 blocks. Each block can be coded using either the 2×2 or 1×2 block prediction mode. FIG. 4A illustrates an example of block prediction for the 1×2 block prediction mode for a 2×8 block located at the first line of a slice according to the conventional ADSC. Partitions 410a and 410b represent two 1×2 partitions of the current block being processed and pixel row 440 filled with slant-lines represents reconstructed pixels prior to the blocks being processed. Blocks 420 and 430 correspond to two candidate blocks for partitions 410b and 410a of the current block respectively. Block vectors 412 and 413 represent the block vectors pointing from partition 410b to the candidate predictor 420 and from partition 410a to candidate predictor 430 respectively.

Figure 4B:
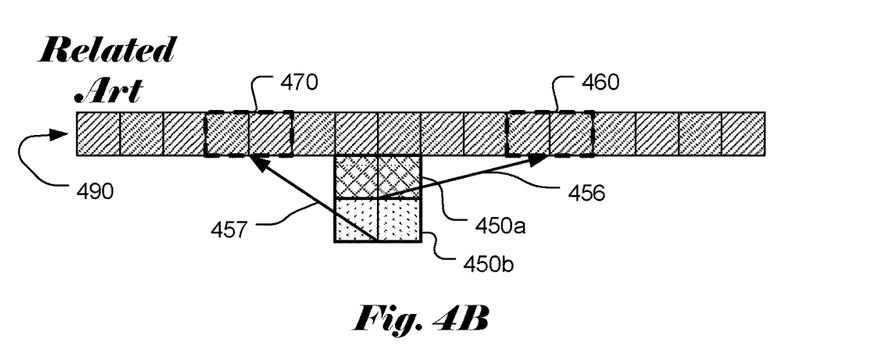
FIG. 4B illustrates another example of block prediction for the 1×2 block prediction mode according to the conventional ADSC for a block in a non-first line of the slice.

FIG. 4B illustrates another example of block prediction for the current block in a non-first line of the slice using the 1×2 block prediction mode according to the conventional ADSC, where an above reconstructed pixel line 490 in the same slice is used for deriving predictors. Blocks 450a and 450b represent two 1×2 partitions being processed. Blocks 460 and 470 correspond to two candidate blocks for the current partitions 450a and 450b respectively. Block vectors 456 and 457 represent the block vectors pointing from the current partition 450a to the candidate block 460 and from the current partition 450b to the candidate block 470 respectively. Again, according to the conventional ADSC, only one row of reconstructed pixels is used for block prediction in the 1×2 block prediction mode.

Figure 5A:
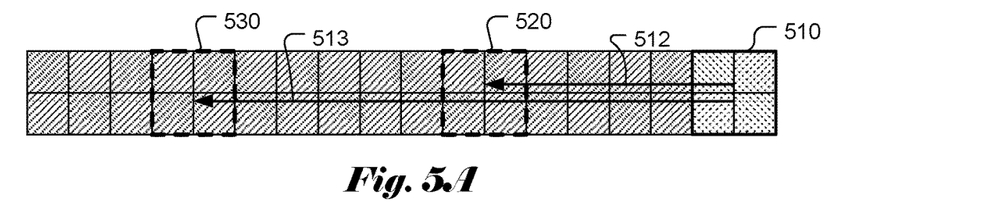
FIG. 5A illustrates an example of block prediction for the 2×2 block prediction mode at the first line of a slice according to the conventional ADSC.

FIG. 5A illustrates an example of block prediction for the 2×2 block prediction mode at the first line of a slice according to the conventional ADSC. Blocks 510 represents a 2×2 block being processed and pixel rows 540 filled with slant-lines represents two reconstructed pixel rows prior to the block 510. Blocks 520 and 530 correspond to two candidate predictors for the current blocks. Block vectors 512 and 513 represent the block vectors pointing from the current block 510 to the candidate predictors 520 and 530 respectively.

Figure 5B:
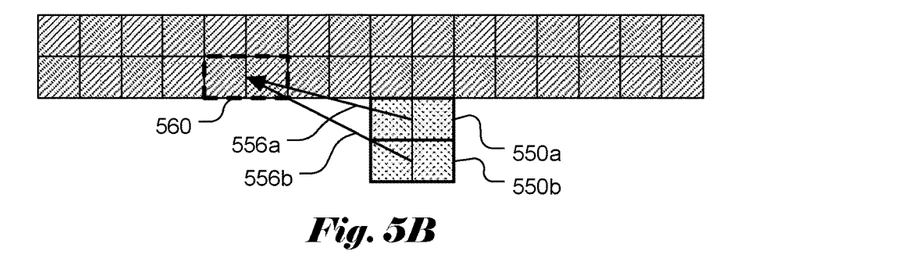
FIG. 5B illustrates an example of block prediction for the 2×2 block prediction mode at a non-first line of a slice according to the conventional ADSC.

FIG. 5B illustrates an example of block prediction for the 2×2 block prediction mode at a non-first line of a slice according to the conventional ADSC. Partitions 550a and 550b represent two parts of a 2×2 block being processed. Block 560 corresponds to a candidate predictor for both sub-blocks 550a and 550b. Block vectors 556a and 556b represent the block vectors pointing from the partitions 550a and 550b to the candidate block 560.

Figure 5C:
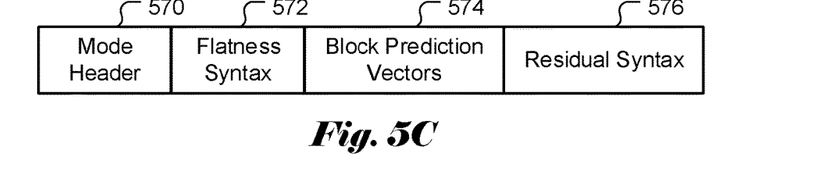
FIG. 5C illustrates the bitstream syntax of BP mode according to the draft ADSC standard.

FIG. 5C illustrates the bitstream syntax of BP mode according to the draft ADSC standard. The bitstream syntax comprises Mode Header field 570, Flatness Syntax field 572, Block Prediction Vectors field 574 and Residual Syntax field 576. The Mode header field 570 is used to signal the prediction mode selected for a current coding unit. If the BP mode is selected, the Mode Header field 570 will indicate such selection. As shown in FIG. 2A, the flatness is determined for each coding unit and the flatness indication is entropy coded using Entropy Coding 216. The coded flatness information is then included in the Flatness Syntax field 572. The Block Prediction Vectors field 574 is used to signal the motion vector(s) for the current coding unit to locate the corresponding predictors. As mentioned before, when prediction is used, the prediction residues are always transmitted according to the draft ADSC standard. The Residual Syntax field 576 is used to signal the required prediction residues.

Figure 6A:
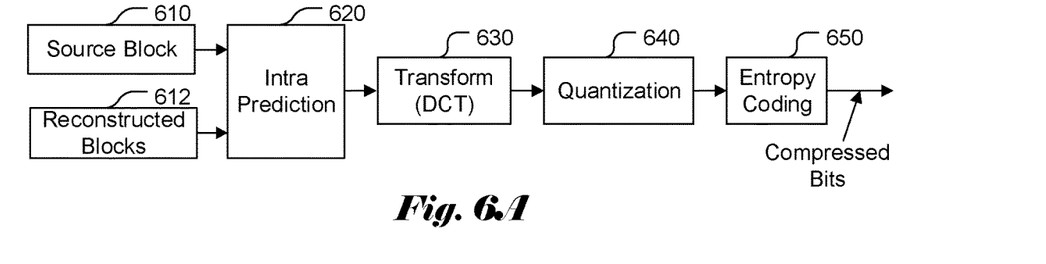
FIG. 6A illustrates an example of the Transform prediction process according to the conventional Advanced Display Stream Compression (ADSC).
Figure 6B:
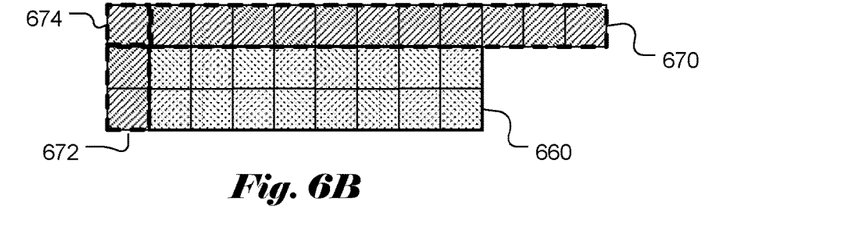
FIG. 6B illustrates the reconstructed pixels around a current block that are used to perform Intra prediction.

For the Transform mode, the prediction process is similar to the Intra prediction mode used in more recent coding standards such as HEVC, with multiple Intra-Prediction modes including different prediction directions. The Transform prediction and coding process are shown in FIG. 6A, where a source block 610 (e.g., a coding unit) and reconstructed blocks 612 are input to the Intra prediction unit 620 to generate prediction residues. The prediction residues are processed by Transform unit 630, Quantization unit 640 and Entropy Coding unit 650 to generate compressed bits for the current block. For example, the source block may correspond to a 2×8 block. The reconstructed blocks may include an above block, a left block and an upper-left block of the current block. For Transform mode with 2×8 blocks, ADSC Transform mode uses the pixels (670) above the current block (660), the pixels (672) to the left of the current block, and an upper-left corner pixel (674) of the current block as shown in FIG. 6B. The pixels (670) above the current block (660) also include three pixels extended from the right edge of the current block as shown in FIG. 6B. The Intra prediction according to the ADSC draft standard allows encoding each 2×8 block as one 2×8 block or two 2×4 blocks.

Figure 6C:
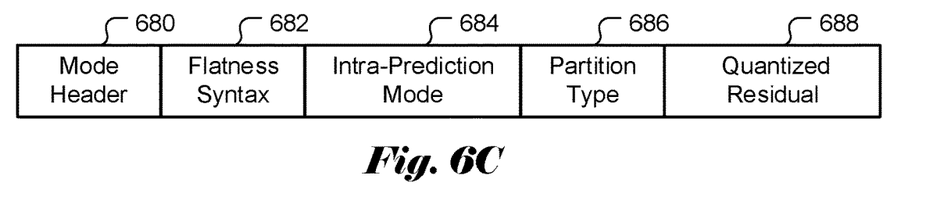
FIG. 6C illustrates the bitstream syntax of Transform mode according to the draft ADSC standard.

FIG. 6C illustrates the bitstream syntax of Transform mode according to the draft ADSC standard. The bitstream syntax comprises Mode Header field 680, Flatness Syntax field 682, Intra-Prediction mode field 684, Partition Type field 686 and Quantized Residual field 688. Since multiple Intra-Prediction modes are used, the Intra-Prediction mode field 684 is used to indicate the selected Intra-Prediction mode for the current coding unit. Since both 2×8 and 2×4 partition modes are supported, the Partition Type field 686 is used to identify the selected block partition. As shown in FIG. 6A, the Intra-Prediction residues are transformed, quantized and entropy coded into the compressed bits. The coded information associated with the Intra-Prediction residues are signaled in the Quantized Residual field 688.

Figure 7A:
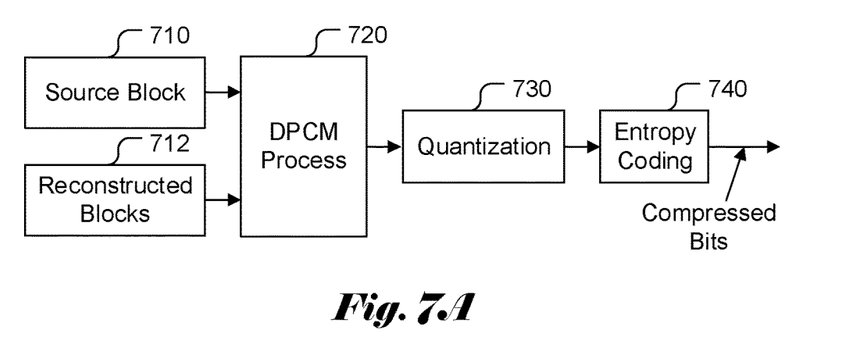
FIG. 7A illustrates an example of the DPCM prediction process according to the conventional Advanced Display Stream Compression (ADSC).
Figure 7B:
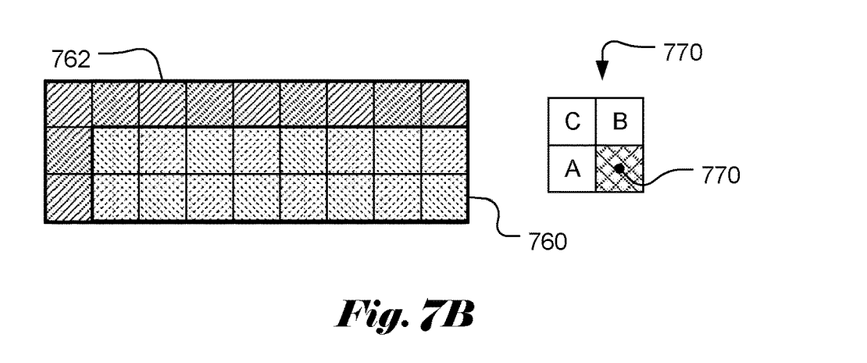
FIG. 7B illustrates the reconstructed pixels around a current block that are used for DPCM prediction.

For the DPCM mode, the prediction and coding processes are shown in FIG. 7A, where a source block 710 (e.g., a coding unit) and reconstructed blocks 712 are input to the DPCM process unit 720 to generate prediction residues. The prediction residues are processed by Quantization unit 730 and Entropy Coding unit 740 to generate compressed bits for the current block. For a current block 760 in FIG. 7B, the reconstructed pixels 762 for DPCM prediction are these reconstructed pixels above the block and on the left of the current block. The DPCM configuration 770 is shown in FIG. 7B, where a current pixel 770 derives a predictor based on three pixels (i.e., A, B and C) around the pixel. Depending on the location of the current pixel with respect to the current block, a neighboring pixel (i.e., A, B or C) may be a neighboring reconstructed pixel in area 762 or a reconstructed pixel within the current block 760 that is processed prior to the current pixel.

Figure 7C:
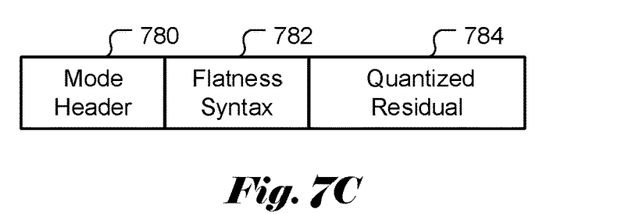
FIG. 7C illustrates exemplary bitstream syntax of DPCM mode according to the draft ADSC standard.

FIG. 7C illustrates the bitstream syntax of DPCM mode according to the draft ADSC standard. The bitstream syntax comprises Mode Header field 780, Flatness Syntax field 782, and Quantized Residual field 784

As shown above, the prediction residues are always coded and included in the residual field. The prediction residues may be quantized and entropy coded into the bitstream of the compressed images. In the Transform mode, the prediction residues are transformed first before quantization and entropy coding. The prediction residues usually take up a significant part of the overall bitrate of the compressed image. However, for some image data, the prediction may work well so that the prediction residues are relatively small and may be even equal to or close to zero. For conventional prediction processes, the prediction residues will be further processed to generate coded bits to be incorporated into the bitstream regardless of the conditions of the prediction residues, such as very small prediction residues. In these cases, the coding efficiency may not be optimal. In addition, valuable system computational resources (e.g., processing power and system bandwidth) will be consumed to code the prediction residues into the bitstream. As mentioned above, the coding process may include transform, quantization, entropy coding or a combination of them. Therefore, the processing could be very intensive.

In the field of video coding, there is a technique to skip signaling the residues for Inter prediction to achieve a high degree of compression. A current block may use motion information from neighboring blocks to predict the current motion information. If there is a good match, the current block can inherit its motion information from a previously coded neighboring block. Therefore, the current motion information can be derived by identifying the neighboring block from a list. Furthermore, if the prediction residues are small, the signaling of the prediction residues can be skipped. In other words, the prediction residues are treated as zero. In order to improve the coding efficiency, the present invention discloses a new prediction mode for image coding that does not signal the prediction residues. At the decoder side, when this no-residue prediction mode is detected, all-zero residues are used to reconstruct the signal according to the prediction process. While the zero value can be used for the residues, other pre-defined values may also be used. Since the use of no-residue prediction mode will skip the processing for encoding the prediction residues into the bitstream or decoding coded prediction residues to reconstruct a current block, the no-residue prediction mode may also be used when the encoder does not have adequate computation resources or when the encoder estimates high processing at the decoder side.

The no-residue prediction mode can be applied to various prediction modes used in an image coding system. For example, the no-residue prediction mode can be applied to Block Prediction (BP) mode of ADSC. This no-residue prediction mode for Block Prediction (BP) is referred as no-residue BP mode. This new mode can be added to the modes of mode decision process of ADSC as shown in FIG. 2B. The RD-cost associated with the new mode (i.e., no-residue BP mode) can be calculated and provided to mode decision process to choose a best mode among the available modes. As disclosed in the draft ADSC standard, a current block can be predicted using reconstructed pixels in an allowed area. One or more block prediction vectors are signaled to identify the locations of these predictors. The prediction residues are generated according to the current block and the predictors. According to the conventional block prediction mode, the prediction residues are further coded into bits to be incorporated into the bitstream. At the decoder side, the predictors can be located according to the block vector(s) signaled in the bitstream. The decoded prediction residues can be added to the predictors to reconstruct the current block.

Figure 8A:
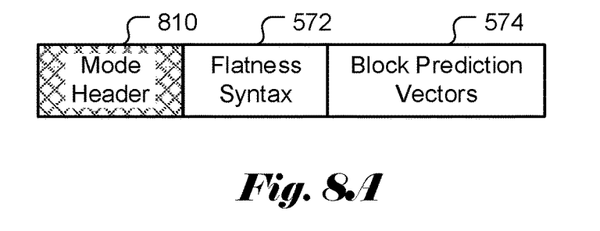
FIG. 8A illustrates exemplary bitstream syntax of no-residue BP mode according to an embodiment of the present invention.

FIG. 8A illustrates exemplary bitstream syntax of no-residue BP mode according to an embodiment of the present invention. The Mode Header field 810 will indicate a no-residue prediction mode. For example, if block prediction is used for the current coding unit, the Mode Header field 810 will indicates no-residue BP mode. In this case, the flatness information and the block vectors will be signaled in the Flatness Syntax field 572 and Block Prediction Vectors field 574 respectively as the draft ADSC standard. However, the new bitstream syntax does not include Residual Syntax field 576 since there is no prediction residue to be signaled according to the present invention.

While the block prediction as specified in the draft ADSC standard is used as an example of no-residue block prediction, the present invention is not limited to the specific block prediction process. For example, embodiments of the present invention may use other block sizes different from these specified in the draft ADSC standard. Embodiments of the present invention may also use any reconstructed pixels in the same slice or image as the current coding unit instead of the limited reconstruction areas prediction as specified in the draft ADSC standard. Embodiments of the present invention may also derive predictors from one or more selected reconstructed areas for the purposes of reduced complexity or improved performance.

A coding system incorporating an embodiment of the present invention is disclosed as follows. The image to be coded is partitioned into one or more slices and each slice is further partitioned multiple coding units. Each coding unit consists of N×M pixels. The coding process is applied to each slice on a coding unit by coding unit basis. A corresponding prediction process can be selected to code a current coding unit. The corresponding prediction process can be a prediction process similar to a conventional prediction mode for the draft ADSC standard. For example, the prediction process similar to the BP prediction process of ADSC can be used to locate predictors for the current block. However, embodiment of the present invention is not limited to use the same reconstructed areas or the same coding unit size as the ADSC. One or more motion vectors are signaled to locate the selected predictors for the current coding unit. If the system decides to use the no-residue prediction mode, the selection of this no-residue prediction mode will be indicated for the current block and no residues will be signaled for the current block.

Figure 8B:
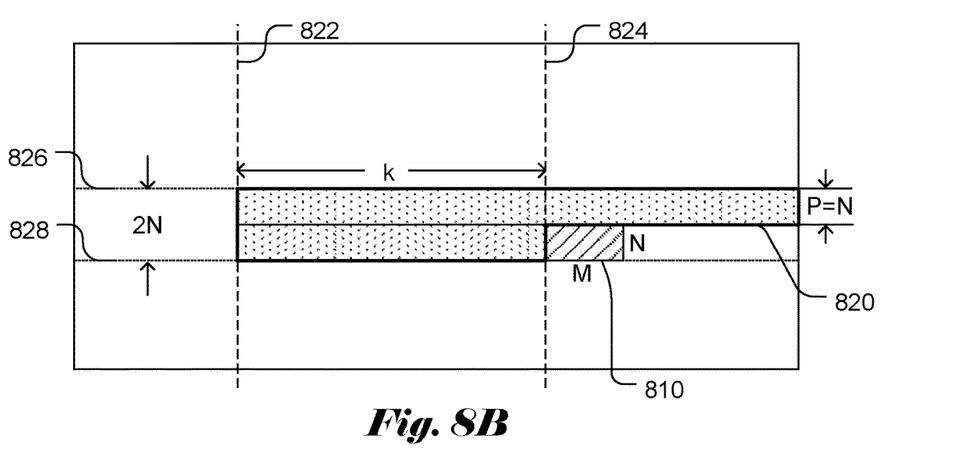
FIG. 8B illustrates an example of reconstructed area for no-residue prediction based on the block prediction.

According to the above embodiment, an example of reconstructed area for no-residue prediction based on the block prediction is shown in FIG. 8B. A current coding unit 810 consisting of N×M pixels is being processed. The area of reconstructed pixels 820 is bounded by a vertical line 822 located at k pixels to the left of the left edge 824 of the current coding unit, a horizontal line 826 located at P pixel lines above the top edge of the current coding unit and a horizontal line at the bottom edge of the current coding unit. In particular, P is equal to N in the example shown in FIG. 8B. In other words, the number of reconstructed pixel lines above the top edge of the current coding unit is the same as the height of the coding unit. For the area above the current coding unit, the right boundary is the right edge of the slice or image. For the reconstructed area in the same coding unit row, the right boundary is the left edge of the coding unit. Parameter k is a positive integer and can be selected according to desired performance or system complexity constraint. As is known in the art, a larger k (i.e., larger search area) may result in better performance. However, it will result in higher system complexity since more prediction candidates have to be searched. Parameter k can be pre-defined or explicitly signaled. While one coding unit row above the current coding unit is used, more coding rows above may be used. Furthermore, N reconstructed lines (i.e., one coding unit row) is used in this example, more or less reconstructed lines may be used to practice the present invention. As known for block prediction, a best match between predictors in the reconstructed area and the current coding unit can be identified according to a criterion such as rate-distortion optimization (RDO) or simply according to the minimum difference. The predictors for the current coding unit can be located by one or more block vectors, which are signaled in the bitstream. Furthermore, the block vectors may be predictively coded.

Upon the selection of predictors for the current coding unit, the prediction residues can be generated. If the encoder determines to encode the current coding unit in the no-residue BP mode, the encoder will indicate the no-residue prediction mode decision in the Mode Header of the bitstream syntax for the current coding unit. If the encoder determines to encode the current coding unit in the regular BP mode, the coded prediction residues will be signaled using in the bitstream such as the Residual Syntax 576 in FIG. 5C. Whether to use the no-residue BP prediction mode may be based on a distortion condition. If the distortion condition is satisfied, the no-residue BP mode is used. Otherwise, other prediction modes such as the regular BP prediction mode may be used. For example, the distortion condition may correspond to the "quantization parameter (QP) value of the current coding unit being greater than or equal to a threshold value". If this distortion condition is satisfied, the current coding unit is coded using the no-residue prediction mode. Otherwise, the current coding unit is coded using one of other modes, such as the regular prediction mode. In another example, the distortion condition may correspond to the "all values of the prediction residues for the current coding unit are less than or equal to a threshold value". If this distortion condition is satisfied, the current coding unit is coded using the no-residue prediction mode. Otherwise, the current coding unit is coded using one of other modes, such as the regular prediction mode. The decision regarding whether to use no-residue BP prediction mode may also depend on a cost measure associated with the prediction residues. For example, the rate-distortion optimization can be used to evaluate the rate-distortion cost for the prediction residues. If the cost for coding without the prediction residues is the lowest, the cost measure will favor coding without the prediction residues and choose the no-residue BP mode.

The encoder may also have to perform other steps related to the regular prediction mode. For example, the flatness information has to be determined for the current coding unit and the derived information is signaled in the bitstream syntax of the current coding unit.

In another embodiment of the present invention, the prediction residues for block prediction are forced to zero. In yet another embodiment, if the predictor residues are all zero, the no-residue mode is used to avoid the need to signal the prediction residues in this case.

Figure 9A:
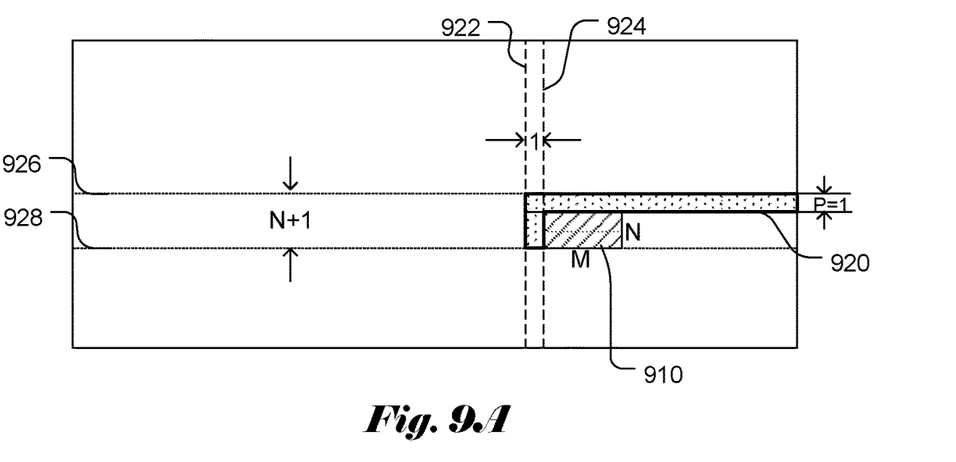
FIG. 9A illustrates an example of the prediction area for the current coding unit for Transform mode.
Figure 9B:
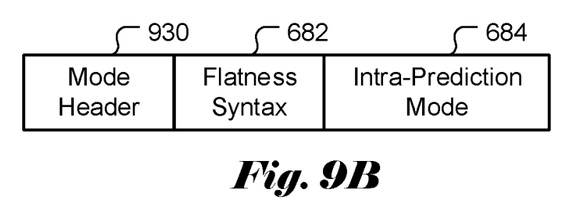
FIG. 9B illustrates exemplary bitstream syntax of Transform mode according to an embodiment of the present invention.

In another example, the no-residue prediction mode is applied to Transform mode of ADSC. An example of the prediction area 920 for the current coding unit 910 is shown in FIG. 9A. The current coding unit 910 consisting of N×M pixels is being processed. The area of reconstructed pixels 920 is bounded by a vertical line 922 located at 1 pixels to the left of the left edge 924 of the current coding unit, a horizontal line 926 located at 1 pixel line above the top edge of the current coding unit and a horizontal line at the bottom edge of the current coding unit. For the Transform mode, the prediction residues are generated using Intra prediction, where the predictors are derived from reconstructed blocks. Again, a distortion condition can be checked. If the distortion condition is satisfied, the no-residue prediction mode can be used as indicated in the Mode Header. A new mode will be used to indicate the no-residue transform mode. FIG. 9B illustrates exemplary bitstream syntax of Transform mode according to an embodiment of the present invention. The Mode Header field 930 will indicate a no-residue Transform prediction mode. The fields 682 and 684 can be the same as the conventional approach. However, the Partition Type field 686 and Quantization Residual field 688 are omitted according to the embodiment. This new mode can be added to the modes of the mode decision process of ADSC as shown in FIG. 2B. The RD-cost associated with the new mode (i.e., no-residue transform mode) can be calculated and provided to the mode decision process to choose a best mode among the available modes.

In another embodiment of the present invention, the prediction residues for Transform mode are forced to zero. In yet another embodiment, if the predictor residues of Transform mode are all zero, the no-residue Transform mode can be used to avoid the need to signal the prediction residues in this case.

Figure 10:
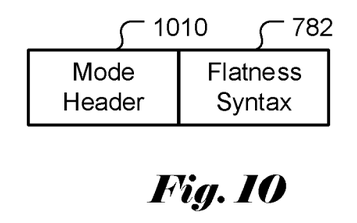
FIG. 10 illustrates exemplary bitstream syntax of DPCM mode according to an embodiment of the present invention.

In another example, the no-residue prediction mode is applied to DPCM mode of ADSC. The prediction area 920 as shown in FIG. 9A can be used for the DPCM mode. For the DPCM mode, the prediction residues are generated based on neighboring pixels of the current block as well as one or more pixels in the current block that are processed prior to the current pixel. Again, a distortion condition can be checked. If the distortion condition is satisfied, the no-residue prediction mode can be used as indicated in the Mode Header. A new mode will be used to indicate the no-residue DPCM mode. FIG. 10 illustrates exemplary bitstream syntax of DPCM mode according to an embodiment of the present invention. The Mode Header field 1010 indicates a no-residue DPCM prediction mode. The field 782 can be the same as the conventional approach. However, the Quantization Residual field 784 is omitted according to the embodiment. This new mode can be added to the modes of mode decision process of ADSC as shown in FIG. 2B. The RD-cost associated with the new mode (i.e., no-residue DPCM mode) can be calculated and provided to the mode decision process to choose a best mode among the available modes.

In another embodiment of the present invention, the prediction residues for DPCM prediction are forced to zero. In yet another embodiment, if the predictor residues of DPCM mode are all zero, the no-residue DPCM mode can be used to avoid the need to signal the prediction residues in this case.

Figure 11:
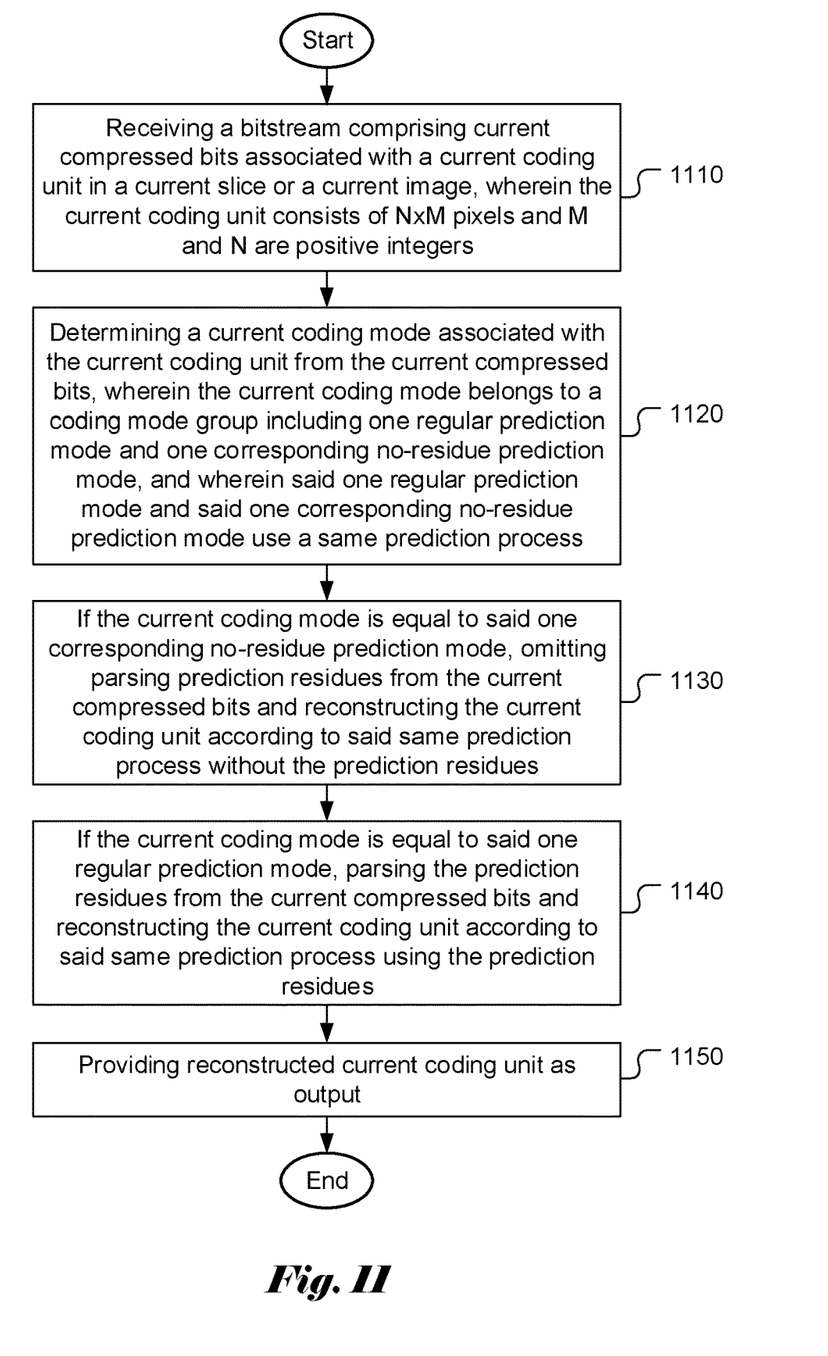
FIG. 11 illustrates a flowchart for an image decoder incorporating no-residue prediction mode according to an embodiment of the present invention.

FIG. 11 illustrates a flowchart for an image decoder incorporating no-residue prediction mode according to an embodiment of the present invention. The flowchart may correspond to software program codes to be executed on a computer, a mobile device, a digital signal processor or a programmable device for the disclosed invention. The program codes may be written in various programming languages. The flowchart may also correspond to hardware based implementations, with one or more electronic circuits (e.g. ASIC (application specific integrated circuits) and FPGA (field programmable gate array)) or processors (e.g. DSP (digital signal processor)). According to this method, a bitstream comprising current compressed bits associated with a current coding unit in a current slice or a current image is received in step 1110, where the current coding unit consists of N×M pixels and M and N are positive integers. A current coding mode associated with the current coding unit is determined from the current compressed bits in step 1120, where the current coding mode belongs to a coding mode group including one regular prediction mode and one corresponding no-residue prediction mode, and said one regular prediction mode and said one corresponding no-residue prediction mode use a same prediction process. As mentioned previously, the regular prediction mode may correspond to Block Prediction mode, Transform mode or DPCM mode. If the current coding mode is equal to said one corresponding no-residue prediction mode, parsing prediction residues from the current compressed bits is omitted and the current coding unit is reconstructed according to said same prediction process without the prediction residues in step 1130. If the current coding mode is equal to said one regular prediction mode, the prediction residues are parsed from the current compressed bits and the current coding unit is reconstructed according to said same prediction process using the prediction residues in step 1140. The reconstructed current coding unit is then provided as output in step 1150.

Figure 12:
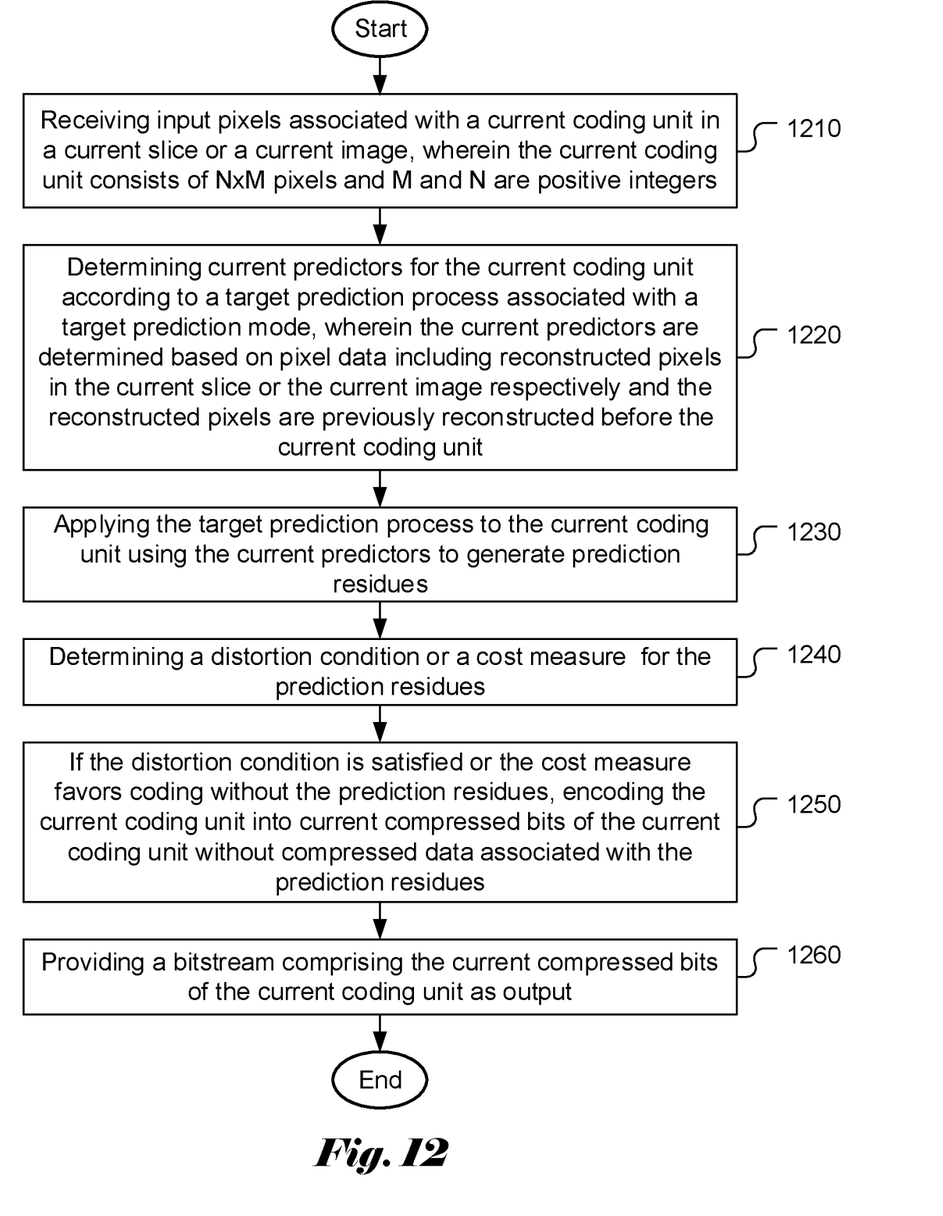
FIG. 12 illustrates a flowchart for an image encoder incorporating no-residue prediction mode according to an embodiment of the present invention.

FIG. 12 illustrates a flowchart for an image encoder incorporating no-residue prediction mode according to an embodiment of the present invention. The flowchart may correspond to software program codes to be executed on a computer, a mobile device, a digital signal processor or a programmable device for the disclosed invention. The program codes may be written in various programming languages. The flowchart may also correspond to hardware based implementation, with one or more electronic circuits (e.g. ASIC (application specific integrated circuits) and FPGA (field programmable gate array)) or processors (e.g. DSP (digital signal processor)). According to this method, input pixels associated with a current coding unit in a current slice or a current image are received in step 1210, where the current coding unit consists of N×M pixels and M and N are positive integers. Current predictors for the current coding unit are determined according to a target prediction process associated with a target prediction mode in step 1220, where the current predictors are determined based on pixel data including reconstructed pixels in the current slice or the current image respectively and the reconstructed pixels are previously reconstructed before the current coding unit. As mentioned previously, the target prediction mode may correspond to Block Prediction mode, Transform mode or DPCM mode. The target prediction process is applied to the current coding unit using the current predictors to generate prediction residues in step 1230. A distortion condition or a cost measure for the prediction residues is determined in step 1240. If the distortion condition is satisfied or the cost measure favors coding without the prediction residues, the current coding unit is encoded into current compressed bits of the current coding unit without compressed data associated with the prediction residues in step 1250. A bitstream comprising the current compressed bits of the current coding unit is provided as output in step 1260.

The flowcharts shown above are intended to illustrate an example of image coding incorporating an embodiment of the present invention. A person skilled in the art may modify each step, re-arrange the steps, split a step, or combine the steps to practice the present invention without departing from the spirit of the present invention.

The flowchart may correspond to software program codes to be executed on a computer, a mobile device, a digital signal processor or a programmable device for the disclosed invention. The program codes may be written in various programming languages such as C++. The flowchart may also correspond to hardware based implementation, where one or more electronic circuits (e.g. ASIC (application specific integrated circuits) and FPGA (field programmable gate array)) or processors (e.g. DSP (digital signal processor)).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into an image compression chip or program code integrated into image compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of image decoding for an image to be performed at a decoder, the method comprising:
receiving a bitstream comprising current compressed bits associated with a current coding unit in a current slice or a current image;
determining whether a current coding mode associated with the current coding unit is a regular prediction mode or a corresponding no-residue prediction mode, wherein the regular prediction mode and the corresponding no-residue prediction mode use a same prediction process that uses prediction information;
if the current coding mode is equal to the corresponding no-residue prediction mode, parsing prediction information from the current compressed bits and reconstructing the current coding unit according to said same prediction process using the prediction information and first prediction residues that are predetermined for the corresponding no-residue prediction mode;
if the current coding mode is equal to the regular prediction mode, parsing the prediction information and second prediction residues from the current compressed bits and reconstructing the current coding unit according to said same prediction process using the prediction information and the second prediction residues; and
providing reconstructed current coding unit as output.

2. The method of claim 1, further comprising determining current predictors for the current coding unit according to said same prediction process, wherein the current predictors are determined based on pixel data including reconstructed pixels in the current slice or the current image respectively and the reconstructed pixels are previously reconstructed before the current coding unit.

3. The method of claim 2, wherein the reconstructed current coding unit is equal to the current predictors if the current coding mode is equal to the corresponding no-residue prediction mode.

4. The method of claim 2, wherein the regular prediction mode corresponds to Block Prediction mode.

5. The method of claim 4, wherein:
the current coding unit consists of N×M pixels and M and N are positive integers; and
the reconstructed pixels are within a reconstructed area bounded by a horizontal line located at N pixel lines above the current coding unit, and a vertical line located at k pixels to the left of left edge of the current coding unit and k is a positive integer.

6. The method of claim 5, wherein one or more block vectors are derived from the current compressed bits and said one or more block vectors point from the current coding unit to the current predictors in the reconstructed area.

7. The method of claim 2, wherein the regular prediction mode corresponds to Transform mode, and wherein Intra prediction is applied to reconstruct the current coding unit.

8. The method of claim 7, wherein the reconstructed pixels are within a reconstructed area bounded by a horizontal line located at one pixel line above the current coding unit, and a vertical line located at one pixel to the left of left edge of the current coding unit.

9. The method of claim 2, wherein the regular prediction mode corresponds to differential pulse code modulation (DPCM) mode, and wherein for each current pixel in the current coding unit, DPCM prediction process uses one pixel above, one pixel on the left and one pixel at upper-left corner of said each current pixel to generate a predictor for said each current pixel.

10. The method of claim 9, wherein the reconstructed pixels are within a reconstructed area bounded by a horizontal line located at one pixel line above the current coding unit, and a vertical line located at one pixel to the left of left edge of the current coding unit.

11. An apparatus for image coding of an image, wherein the apparatus comprising one or more electronic circuits or processors arranged to:
receive a bitstream comprising current compressed bits associated with a current coding unit in a current slice or a current image;
determine whether a current coding mode associated with the current coding unit is a regular prediction mode or a corresponding no-residue prediction mode, wherein the regular prediction mode and the corresponding no-residue prediction mode use a same prediction process that uses prediction information;
if the current coding mode is equal to the corresponding no-residue prediction mode, parsing prediction information from the current compressed bits and reconstruct the current coding unit according to said same prediction process using the prediction information and first prediction residues that are predetermined for the corresponding no-residue prediction mode;
if the current coding mode is equal to the regular prediction mode, parse the prediction information and second prediction residues from the current compressed bits and reconstruct the current coding unit according to said same prediction process using the prediction information and the second prediction residues; and
provide reconstructed current coding unit as output.

12. The apparatus of claim 11, wherein the one or more electronic circuits or processors are further arranged to determine current predictors for the current coding unit according to said same prediction process, wherein the current predictors are determined based on pixel data including reconstructed pixels in the current slice or the current image respectively and the reconstructed pixels are previously reconstructed before the current coding unit.

13. The apparatus of claim 12, wherein the reconstructed current coding unit is equal to the current predictors if the current coding mode is equal to the corresponding no-residue prediction mode.

14. The apparatus of claim 12, wherein the regular prediction mode corresponds to Block Prediction mode.

15. The apparatus of claim 14, wherein:
the current coding unit consists of N×M pixels and M and N are positive integers; and
the reconstructed pixels are within a reconstructed area bounded by a horizontal line located at N pixel lines above the current coding unit, and a vertical line located at k pixels to the left of left edge of the current coding unit and k is a positive integer.

16. The apparatus of claim 15, wherein one or more block vectors are derived from the current compressed bits and the or more block vectors point from the current coding unit to the current predictors in the reconstructed area.

17. The apparatus of claim 12, wherein the regular prediction mode corresponds to Transform mode, and wherein Intra prediction is applied to reconstruct the current coding unit.

18. The apparatus of claim 17, wherein the reconstructed pixels are within a reconstructed area bounded by a horizontal line located at one pixel line above the current coding unit, and a vertical line located at one pixel to the left of left edge of the current coding unit.

19. The apparatus of claim 12, wherein the regular prediction mode corresponds to differential pulse code modulation (DPCM) mode, and wherein for each current pixel in the current coding unit, DPCM prediction process uses one pixel above, one pixel on the left and one pixel at upper-left corner of said each current pixel to generate a predictor for said each current pixel.

20. The apparatus of claim 19, wherein the reconstructed pixels are within a reconstructed area bounded by a horizontal line located at one pixel line above the current coding unit, and a vertical line located at one pixel to the left of left edge of the current coding unit.

* * * * *